(12) United States Patent
Quinn et al.

(10) Patent No.: US 8,104,087 B2
(45) Date of Patent: Jan. 24, 2012

(54) SYSTEMS AND METHODS FOR AUTOMATED DATA ANOMALY CORRECTION IN A COMPUTER NETWORK

(75) Inventors: Mitchell N. Quinn, Raleigh, NC (US); David E. Hooks, Cary, NC (US)

(73) Assignee: Triumfant, Inc., Research Triangle Park, NC (US)

(*) Notice: Subject to any disclaimer, the term of this patent is extended or adjusted under 35 U.S.C. 154(b) by 797 days.

(21) Appl. No.: 11/970,650

(22) Filed: Jan. 8, 2008

(65) Prior Publication Data

US 2009/0177913 A1  Jul. 9, 2009

(51) Int. Cl.
G06F 9/445 (2006.01)
G06F 11/07 (2006.01)

(52) U.S. Cl. ............................. 726/22; 717/172; 717/173

(58) Field of Classification Search .................. 726/22, 726/25, 23; 717/172, 173
See application file for complete search history.

(56) References Cited

U.S. PATENT DOCUMENTS

| | | | |
|---|---|---|---|
| 4,368,462 A | 1/1983 | Crawley | |
| 5,220,668 A | 6/1993 | Bullis | |
| 5,499,357 A | 3/1996 | Sonty et al. | |
| 5,905,988 A | 5/1999 | Schwartz et al. | |
| 6,058,102 A | 5/2000 | Drysdale et al. | |
| 6,243,702 B1 | 6/2001 | Bamford et al. | |
| 6,269,401 B1 | 7/2001 | Fletcher et al. | |
| 6,324,656 B1 | 11/2001 | Gleichauf et al. | |
| 6,363,477 B1 | 3/2002 | Fletcher et al. | |
| 6,578,077 B1 | 6/2003 | Rakoshitz et al. | |
| 6,636,851 B1 | 10/2003 | Bamford et al. | |
| 6,751,794 B1 * | 6/2004 | McCaleb et al. .............. 717/168 |
| 6,801,940 B1 | 10/2004 | Moran et al. | |
| 6,856,942 B2 | 2/2005 | Garnett et al. | |
| 6,959,265 B1 | 10/2005 | Candela et al. | |
| 7,010,607 B1 | 3/2006 | Bunton | |
| 7,013,084 B2 | 3/2006 | Battou et al. | |
| 7,020,697 B1 | 3/2006 | Goodman et al. | |
| 7,035,930 B2 | 4/2006 | Graupner et al. | |
| 7,039,705 B2 | 5/2006 | Graupner et al. | |
| 7,054,932 B2 | 5/2006 | Herrmann et al. | |
| 7,058,704 B1 | 6/2006 | Mangipudi et al. | |
| 7,065,573 B2 | 6/2006 | Byrnes | |
| 7,072,960 B2 | 7/2006 | Graupner et al. | |
| 2002/0174207 A1 | 11/2002 | Battou | |
| 2003/0046260 A1 | 3/2003 | Satyanarayanan et al. | |
| 2003/0046390 A1 | 3/2003 | Ball et al. | |
| 2003/0110248 A1 | 6/2003 | Ritche | |
| 2003/0182312 A1 | 9/2003 | Chen et al. | |
| 2004/0015599 A1 | 1/2004 | Trinh et al. | |
| 2005/0018618 A1 | 1/2005 | Mualem et al. | |
| 2005/0038818 A1 | 2/2005 | Hooks | |
| 2005/0038827 A1 * | 2/2005 | Hooks ........................... 707/200 |
| 2005/0091348 A1 | 4/2005 | Ferri et al. | |
| 2005/0144314 A1 | 6/2005 | Kan et al. | |

(Continued)

Primary Examiner — Edward Zee
(74) Attorney, Agent, or Firm — Edell, Shapiro & Finnan, LLC

(57) ABSTRACT

Systems and methods for correcting an anomaly in a target computer that is part of a network of computers. An anomaly is detected in data stored on a target computer and it is determined what corrective data is needed to correct the anomaly. A donor computer with the corrective data is located and requested to provide the corrective data to the target computer. The corrective data is used to correct the anomaly on the target computer and the target computer may acknowledge receipt of the corrective data. In one embodiment, an arbitrator component receives the requests for the corrective data, passes the requests to potential donor computers, and receives the acknowledgements from the target computers.

21 Claims, 6 Drawing Sheets

U.S. PATENT DOCUMENTS

| | | | |
|---|---|---|---|
| 2006/0026686 A1* | 2/2006 | Trueba | 726/24 |
| 2006/0059253 A1 | 3/2006 | Goodman et al. | |
| 2006/0130142 A1 | 6/2006 | Mester et al. | |
| 2006/0136720 A1 | 6/2006 | Armstrong et al. | |
| 2008/0016564 A1* | 1/2008 | Claudatos et al. | 726/22 |

* cited by examiner

SYSTEMS AND METHODS FOR AUTOMATED DATA ANOMALY CORRECTION IN A COMPUTER NETWORK

FIELD OF THE INVENTION

The present invention relates to systems and methods for automated computer support.

BACKGROUND OF THE INVENTION

Management of a computer network, even a relatively small one, can be daunting. A network manager or administrator is often responsible for ensuring that users' computers are operating properly in order to maximize productivity and minimize downtime. When a computer begins to function erratically, or ceases to function altogether, a user will often contact a system administrator for assistance. As explained in co-pending U.S. patent application Ser. No. 10/916,956, filed on Aug. 11, 2004 and published as US 2005/0038827 ("the '956 application"), there are significant labor costs associated with investigating, diagnosing, and resolving problems associated with individual computers on a computer network.

There may be any number of reasons why a given computer is not working properly, including missing or corrupted file(s) or registry key(s), "malware" (including viruses and the like), as well as user-error. Unfortunately, it is not uncommon that an information technology (IT) department of a typical organization lacks the resources or ability to receive notice of a reported problem regarding a given computer, thereafter investigate the same to identify a root cause of the problem, and then implement an appropriate fix/repair/correction for the given computer. As a result, instead of delving into the details of most reported computer problems, network managers and IT departments often resort to three common "brute force" methodologies to address reported problems:

Backups, wherein a full system or application is replaced with a previously stored backed-up version;

Golden Image, wherein all applications and data are reset back to a baseline configuration; and/or Re-imaging, wherein all software is re-installed, anew, on the computer.

The foregoing "brute force" approaches to computer problem remediation, as those skilled in the art will appreciate, amount to blanket data replacement methodologies that are not responsive to fixing, e.g., a singular, specific problem on a given computer and, moreover, often result in many undesirable side effects for the computer user. For example, the user may experience loss of user customized settings, may have to work through a lengthy downtime period, or may wind up losing user data.

In light of the often critical importance of maintaining user data and avoiding unnecessary downtime, there is a need to provide a different approach to computer problem remediation.

SUMMARY OF THE INVENTION

Embodiments of the present invention provide systems and methods for fixing or repairing an anomaly detected in computer data stored on a computer, with little or no human intervention. One feature of the present invention is to leverage non-corrupt available data or "assets" (such as, but not limited to, files, portions of files, or registry keys) from a Donor computer, and pass that asset to a target or Recipient computer on which an anomaly has been detected.

In one embodiment, the Recipient computer (i.e., the computer having an anomaly detected thereon) makes an asset request to an Arbitrator component that manages asset requests and donations. The Arbitrator component, based on the asset request, generates and sends a donation request to one more Donor computers believed or known to have the asset being sought. The receiving Donor computer then responds by sending an asset donation message, including the requested asset, to the Recipient computer that initiated the asset request. To "close the loop," the Recipient computer optionally may then send an acknowledgement to the Arbitrator component indicating that the requested asset has been received. The Arbitrator may then remove original asset request from a list or queue of pending asset request. Assets may also be passed through the Arbitrator, rather than being sent directly (or addressed) to the target or Recipient.

The '956 application describes a system and method by which an anomaly on a given computer can be detected by using an "adaptive reference model" that may be used to establish "normal" patterns in data stored on a plurality of computers in a given network of computers. The present invention may leverage such a system for anomaly detection, or may rely on any other methodology to identify an anomaly on a computer in a computer network.

Anomalies that are particularly suited to be repaired using the methodology of the present invention include, but are not limited to, a missing file, missing data, or a missing portion of a file or of data, a missing registry key, a corrupted file, or a corrupted registry key. Aspects of the present invention can likewise operate to remove unexpectedly present files or data.

These and other features of embodiments of the present invention and their attendant advantages will be more fully appreciated upon a reading for the following detailed description in conjunction with the associated drawings.

DETAILED DESCRIPTION

Figure 1:
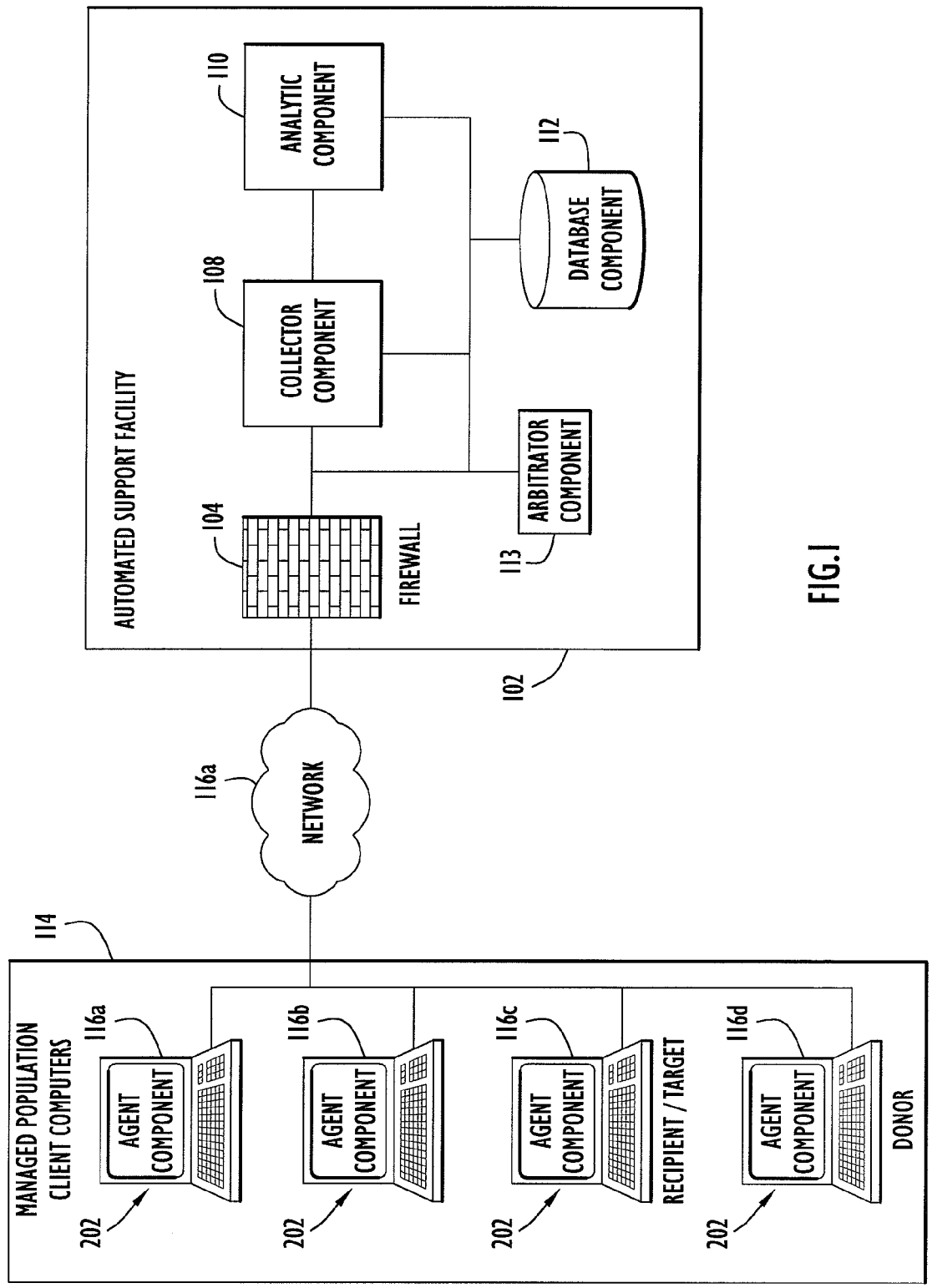
FIG. 1 illustrates an exemplary environment in which an embodiment of the present invention may operate.

Embodiments of the present invention provide systems and methods for automated computer support and remediation. Referring now to the drawings in which like numerals indicate like elements throughout the several figures, FIG. 1 is a block diagram illustrating an exemplary environment in which an embodiment of the present invention may operate. This environment and configuration is described in detail in U.S. application Ser. No. 10/916,956, filed Aug. 11, 2004 ("the '956 application"), which is incorporated herein by reference in its entirety. Although the present invention is described in the context of the '956 application, those skilled in the art will appreciate that aspects of the present invention can be used independently of the systems and methods described therein. On the other hand, the granularity of computer problem/anomaly detection that is made possible by the systems and methods described in the '956 application may help to further leverage the benefits of the problem remediation techniques described in connection with embodiments of the present invention.

Referring again to FIG. 1, there is shown an automated support facility 102. Although the automated support facility 102 is shown as a single facility in FIG. 1, it may comprise multiple facilities or be incorporated into a site where a managed population of computers 114 or network of computers resides. The automated support facility 102 may include a firewall 104 that is in communication with a network 106 for providing security to data stored within the automated support facility 102. The automated support facility 102 may also include a Collector component 108. The Collector component 108 may provide, among other features, a mechanism for transferring data in and out of the automated support facility 102 using, e.g., a standard protocol such as file transfer protocol (FTP) or hypertext transfer protocol (HTTP), or a proprietary protocol. The Collector component 108 may also provide processing logic necessary to download, decompress, and parse incoming data, including "snapshots."

The automated support facility 102 may also include an Analytic component 110 in communication with the Collector component 108 and/or directly with network 106, and thus also the managed population of computers 114. The Analytic component 110 may include hardware and software for creating and operating on an "adaptive reference model" as described in detail in the '956 application, and summarized herein for context.

Database component 112, which may be in communication with both Collector component 108 and Analytic component 110 may be used to store the adaptive reference model(s). The Analytic component 110 extracts adaptive reference models and snapshots from Database component 112, analyzes the snapshots in the context of the reference model, identifies and filters any anomalies, and transmits response agent(s) (FIG. 2) when appropriate, all of which will be explained in more detail below. The Analytic component 110 may also provide a user interface for the system.

FIG. 1 shows only one Collector component 108, one Analytic component 110, and one Database component 112. However, those skilled in the art will appreciate that other possible implementations may include many such components, networked together as appropriate.

As will be described in greater detail herein, embodiments of the present invention provide automated support and remediation to a managed population 114 that may comprise a plurality of client computers 116a-d. Those skilled in the art will appreciate that the four client computers 116a-d shown are illustrative only, and that embodiments of the present invention may operate in the context of computer networks having hundreds, thousands or even more of client computers. The managed population 114 provides data to the automated support facility 102 via the network 106 using respective Agent components 202.

More specifically, an Agent component 202 is deployed within each monitored computer 116a-d and gathers data from its respective computer. For example, at scheduled intervals (e.g., once per day) or in response to a command from the Analytic component 110, the Agent component 202 takes a detailed "snapshot" of the state of the machine in which it resides. This snapshot may include a detailed examination of all system files, designated application files, the registry, performance counters, processes, services, communication ports, hardware configuration, and log files. The results of each scan, the "snapshot," are then (optionally) compressed and transmitted to Collector component 108/database component 112.

Additionally, Agent component 202 is preferably configured to transmit, e.g., over network 106 and thus potentially to all computers 116a-d, requests for corrective data that can be used to replace corrupt data or that can be used to complete missing data on the computer on which the Agent component 202 is resident to, e.g., complete a portion of a missing file. In a preferred embodiment, a request for corrective data (also referred to herein as an "asset") is directed not to all computers, but instead to an Arbitrator component 113, which is shown as being interconnected within automated support facility 102, but may alternatively be implemented as another computer 116 that is in communication with network 106. More details regarding the functionality of the Arbitrator component 113 and its interaction with one or more Agent components 202 of respective computers 116 are provided later herein.

Each of the servers, computers, and network components shown in FIG. 1 comprise processors and computer-readable media. As is well known to those skilled in the art, an embodiment of the present invention may be configured in numerous ways by combining multiple functions into a single computer or alternatively, by utilizing multiple computers to perform a single task.

The processors utilized by embodiments of the present invention may include, for example, digital logic processors capable of processing input, executing algorithms, and generating output as necessary in support of processes according to the present invention. Such processors may include a microprocessor, an ASIC, and state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C#, C++, Visual Basic, Java, and JavaScript.

Figure 2:
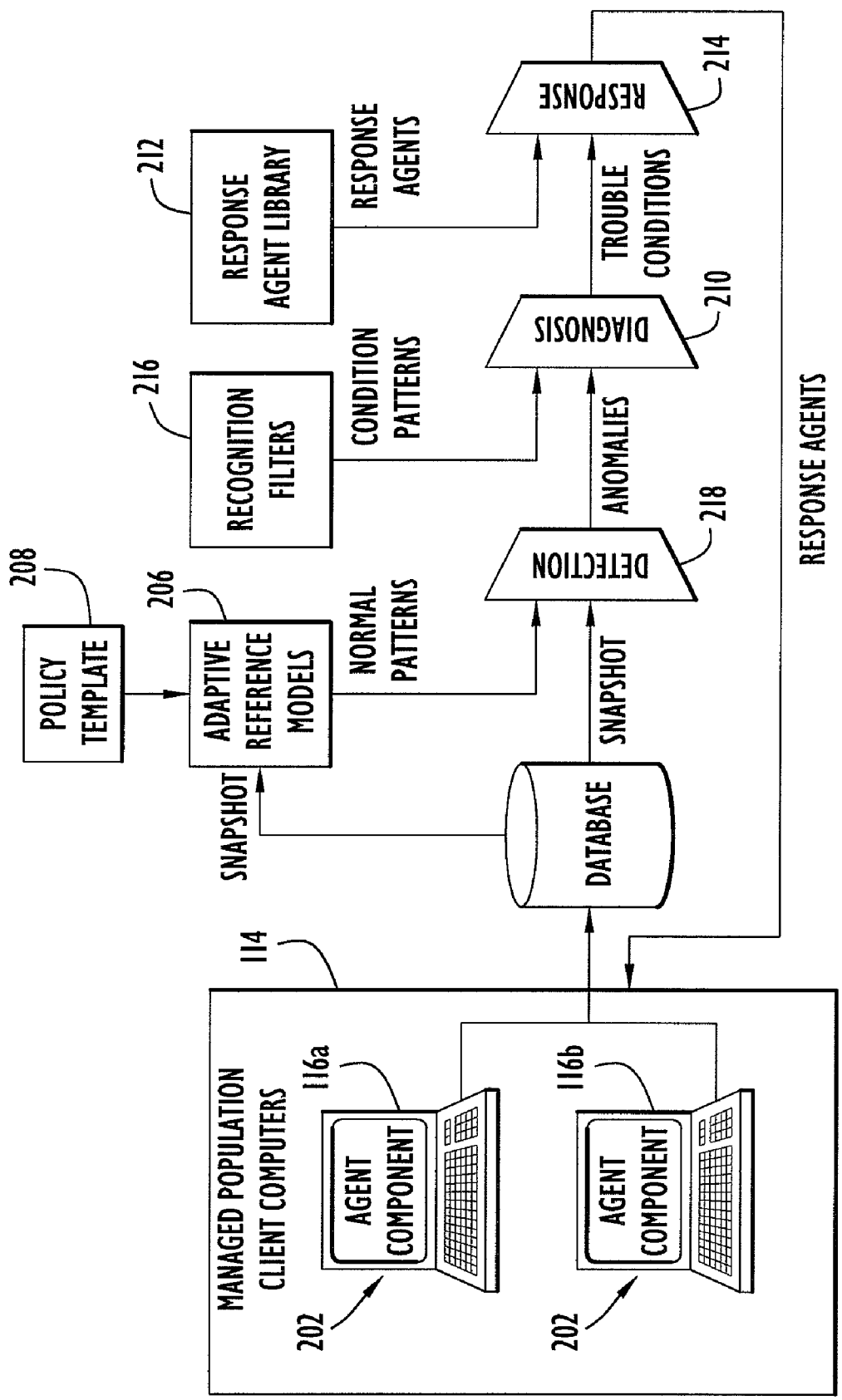
FIG. 2 is a block diagram illustrating a flow of information and actions in accordance with an embodiment of the present invention.

FIG. 2, reproduced from the '956 application, provides additional context with respect to snapshot analysis. Those skilled in the art will appreciate that embodiments of the present invention do not necessarily need to implement the same sort of snapshot analysis described herein and in the '956 application. On the other hand, the granularity of problem detection that is made possible by implementing such a snapshot analysis methodology may help to further leverage the benefits of the problem remediation techniques described herein.

FIG. 2 is a block diagram illustrating a flow of information in connection with snapshot analysis. The embodiment shown comprises, as shown in FIG. 1, an Agent component 202, which may perform several functions. First, it may be responsible for gathering data by scanning the client machine 116 at scheduled intervals, in response to a command from the Analytic component 110, or in response to events of interest detected by the Agent component 202 itself. As mentioned, the scan may include a detailed examination of all system files, designated application files, the registry, performance counters, hardware configuration, logs, running tasks, services, network connections, and other relevant data. The results of each scan may, as already indicated, be compressed and transmitted over a network in the form of a snapshot to the Collector component 108 and/or associated database.

In one embodiment, the Agent component 202 reads every byte of files to be examined and creates a digital signature or hash for each file. The digital signature identifies the exact contents of each file rather than simply providing metadata, such as the size and the creation date. This can be particularly helpful in that some conventional viruses can change the file header information of a given file in an attempt to fool systems that rely on metadata for virus detection. The digital signature methodology that may be implemented in connection with the present invention is thus still able to successfully detect such viruses.

The scan of the client computer 116 by the Agent component 202 may be resource intensive. Accordingly, in one embodiment, a full scan is performed periodically, e.g., daily, during a time when the user may not be using the client machine. In another embodiment, the Agent component 202 performs a delta-scan of the client machine, logging only the changes from the last scan. In still another embodiment, scans by the Agent component 202 are executed on demand, providing a valuable tool for a technician or support person attempting to remedy an anomaly or reported problem on the client machine.

A second major function performed by the Agent component 202 is that of behavior blocking. For example, the Agent component 202 may constantly (or substantially constantly) monitor access to key system resources such as system files and the registry and, where appropriate, selectively block access to these resources in real time to prevent damage from malicious software. While behavior monitoring may occur on an ongoing basis, behavior blocking may be enabled as part of a repair action. For example, if the Analytic component 110 suspects the presence of a virus, it can download a repair action to cause the client, via the Agent component 202, to block the virus from accessing key information resources within the managed system.

A third function performed by the Agent component 202 is to provide an execution environment for "response agents." Response agents may be commands that understood by Agent component 202 or may be more comprehensive "mobile software components" that implement automated procedures to address various types of trouble conditions. For example, if the Analytic component 110 suspects the presence of a virus, it can download a response agent to cause the Agent component 202 to remove the suspicious code or data from the managed system. The Agent component 202 may run as a service or other background process on the computer being monitored. Because of the scope and granularity of information provided by embodiments of the present invention, repair can be performed more accurately than with conventional systems.

Still another function of the Agent component 202 is, in response to a received response agent (which may simply be a command or message, and not necessarily an independently executable function), to initiate a sequence of events beginning with an AssetRequest message to, e.g., Arbitrator component 113, that ultimately causes one or more Donor computers to deliver to the Asset requester (also referred to herein as a "target computer" or "Recipient") specific data, e.g., corrective data, which is then stored within the recipient to replace, or add to, existing data on that computer and thereby remediate a problem or anomaly.

As further shown in FIG. 2, an embodiment of the present invention may include an adaptive reference model component 206, as explained in detail in the '956 application. The adaptive reference model 206 is used to analyze snapshots from many computers and identify statistically significant patterns using a generic data mining algorithm or a proprietary data mining algorithm designed specifically for this purpose. Once a reference is established, one or more sample snapshots can be used to determine if anything abnormal is occurring within the entire population or any member of the population.

A Policy Template component 208 allows the service provider to manually insert rules in the form of "policies" into the adaptive reference model. Policies are combinations of attributes (files, registry keys, etc.) and values that when applied to a model, override a portion of the statistically generated information in the model. This mechanism can be used to automate a variety of common maintenance activities such as verifying compliance with security policies and checking to ensure that the appropriate software updates have been installed.

As part of the information flow of FIG. 2, there is further provided a Detection module 218 that is arranged to receive given ones of snapshots and to detect an anomaly in the snapshot as compared to "normal" patterns provided by a given adaptive reference model. An anomaly, as used herein, may be defined as an unexpectedly present asset, an unexpectedly absent asset, or an asset that has an unknown value. Anomalies may be matched against a library of Recognition Filters 216 via a Diagnosis module 210. A Recognition Filter 216 comprises a particular pattern of anomalies that indicates the presence of a particular root cause condition or a generic class of conditions. Recognition Filters 216 may also associate conditions with a severity indication, a textual description, and a link to a response agent. In another embodiment, a Recognition Filter 216 can be used to identify and interpret benign anomalies. For example, if a user adds a new application that the administrator is confident will not cause any problems, the system according to the present invention will still report the new application as a set of anomalies. If the application is new, then reporting the assets that it adds as anomalies is correct. However, the administrator can use a Recognition Filter 216 to interpret the anomalies produced by adding the application as benign.

If an anomaly is matched to a known condition using a recognition filter, a root cause of a problem may then be known. With that information, namely a Trouble Condition, a Response module 214, in combination with a Response Agent Library 212, can be used to select an appropriate Response Agent to return to Agent component 202 resident on the computer that has been identified as having anomalous data. Further details regarding adaptive reference module development and use can be found in the '956 application. In sum, whether it is via use of an Adaptive Reference Model, or some other means, a necessary element of the present invention is the identification of a particular anomaly that may exist on a given (e.g., target) computer.

At least two main general categories or types of anomalies are particularly suitable for remediation in the context of the present invention. First, there may be an unexpectedly absent (UA) anomaly that occurs when it has been determined that a computer is missing data (e.g., an incomplete installation of a program, or a deleted file or registry key). Second, there may be an unknown value (UV) anomaly that occurs when it has been determined that particular data is different from what it should be (e.g., a file is corrupted, or a registry key has been modified). Remediation (in a highly automated fashion) of both of these types of anomalies is possible with embodiments of the present invention. A third type of anomaly, an unexpectedly present (UP) anomaly, occurs when the computer includes data that should not be there. Remediation of this type of anomaly involves deleting or removing the unexpected data.

Figure 3:
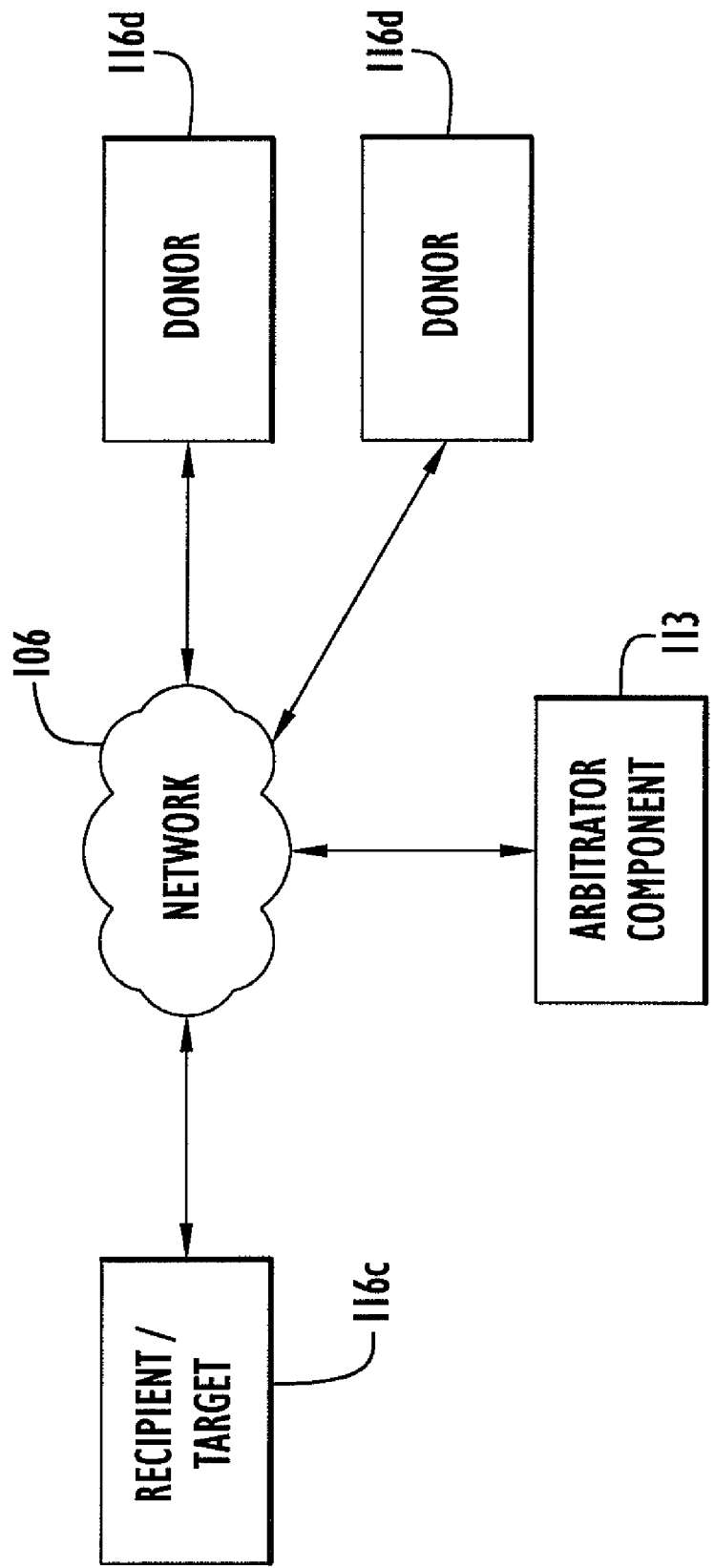
FIG. 3 depicts a recipient or target computer, a donor computer and an arbitrator component in communication with one another via a communications network in accordance with an embodiment of the present invention.

FIG. 3 depicts a simplified schematic diagram of a recipient or target computer 116c, a donor computer 116d (each these two computers having its own Agent component 202), and an Arbitrator component 113 (that may be a stand alone computer in a network environment, or may be part of an automated support facility 102, as described previously) in communication with one another via a communications network 106 in accordance with an embodiment of the present invention. The Arbitrator component 113 is disposed, logically, between Recipient computer 116c and one or more Donor computers 116d. However, from a computer network topology perspective, the Arbitrator component can be disposed, physically, virtually anywhere as long as the Recipient computer 116c and Donor computer(s) 116d can communicate with the Arbitrator component 113. While the Arbitrator component 113 is described herein as a separate functional unit, those skilled in the art will appreciate that the functionality of the Arbitrator component 113 may be located on individual ones of the client computers 116 themselves, although such a configuration may eliminate benefits that may flow from a more centralized arbitrator mechanism.

Figure 4:
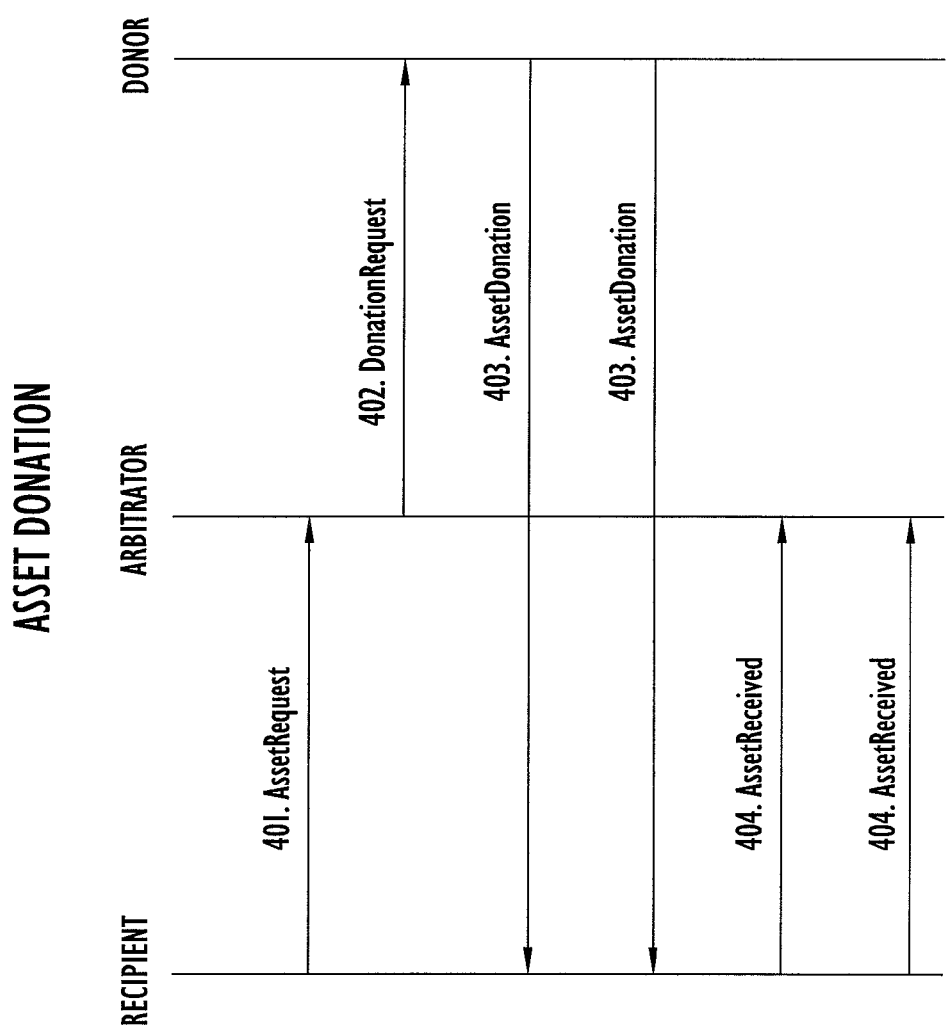
FIGS. 4-6 are exemplary sequence diagrams depicting exchanges of messages and corrective data in accordance with embodiments of the present invention.

Once it has been determined that a target computer 116c is in need of corrective data to correct an anomaly that has been detected on the target computer 116c, aspects of the present invention are initiated. More specifically, and as shown in FIG. 4, Agent component 202 is configured, once it has been determined that a specific asset (or corrective data) is required to correct an anomaly on the Recipient computer 116c, to send an AssetRequest message 401 containing an indication of assets that the Recipient computer 116c needs. A listing or description of which assets are needed to correct a detected anomaly may be provided by the automated support facility 102 by, e.g., a response agent. Alternatively, Agent component 202 may be sufficiently sophisticated to self-diagnose an anomaly, and initiate the AssetRequest message 401 on its own.

Arbitrator component 113 receives the AssetRequest message 401 and locates an appropriate Donor computer that includes the asset or corrective data that is being sought by the Recipient computer. A Donor computer may be identified, for example, by querying any combination of the Collector component 108, Analytic component 110 and Database component 112, as these components, having possibly been responsible for identifying the anomaly in the first place, can also identify a client computer that does not have such an anomaly, and is thus eligible to donate the desired asset or corrective data. A Donor computer may also be selected based on the number of individual assets that it may be in a position to donate. Another factor in selecting a Donor computer may be its physical location. That is, it may be desirable to select a Donor computer that is close to the Recipient computer, or one that, while not physically close, may itself be sufficiently free or is part of a network that is sufficiently free to more easily respond to donation requests. Once a Donor computer has been selected, Arbitrator component 113 sends a DonationRequest message 402 to the selected Donor computer.

The DonationRequest message may be a single message as shown, or may comprise multiple messages, e.g., one for each individual asset being requested.

In response to the DonationRequest message 402, the selected Donor computer returns one or more AssetDonation messages 403 to the Recipient computer that contains the requested asset or corrective data. In one embodiment, each individual AssetDonation message contains a single asset. However, those skilled in the art will appreciate that a single such message may include a plurality of requested assets. In an alternative embodiment, the AssetDonation messages 403 are passed back to the Arbitrator component, which may then forward the message to the Recipient computer, or may, for example, wait for all requested assets to first be delivered, and then generate and send a single message back to the Recipient computer that contains all of the requested assets.

Once Agent component 202 receives the requested assets, and perhaps internally confirms storage thereof, the Recipient computer sends one or more AssetReceived messages 404 to the Arbitrator component 113 acknowledging receipt of the Asset(s). In a preferred embodiment, the Arbitrator component 113 keeps track of pending DonationRequests and, when it receives an AssetReceived message from a Recipient computer, it marks the corresponding Asset in the DonationRequest as received.

When all of the Assets associated with a given DonationRequest are received, the Arbitrator component 113 may remove the DonationRequest from a PendingRequests list that it maintains. In this way, Recipient computer requests for assets are fulfilled, with the burden of the management of the requests falling primarily to Arbitrator component 113. Those skilled in the art will appreciate that while Arbitrator component 113 is shown as a separate module, the functionality of the Arbitrator component 113 may, alternatively, be incorporated into, e.g., the Analytic component 110, or other component of the overall system.

Figure 5:
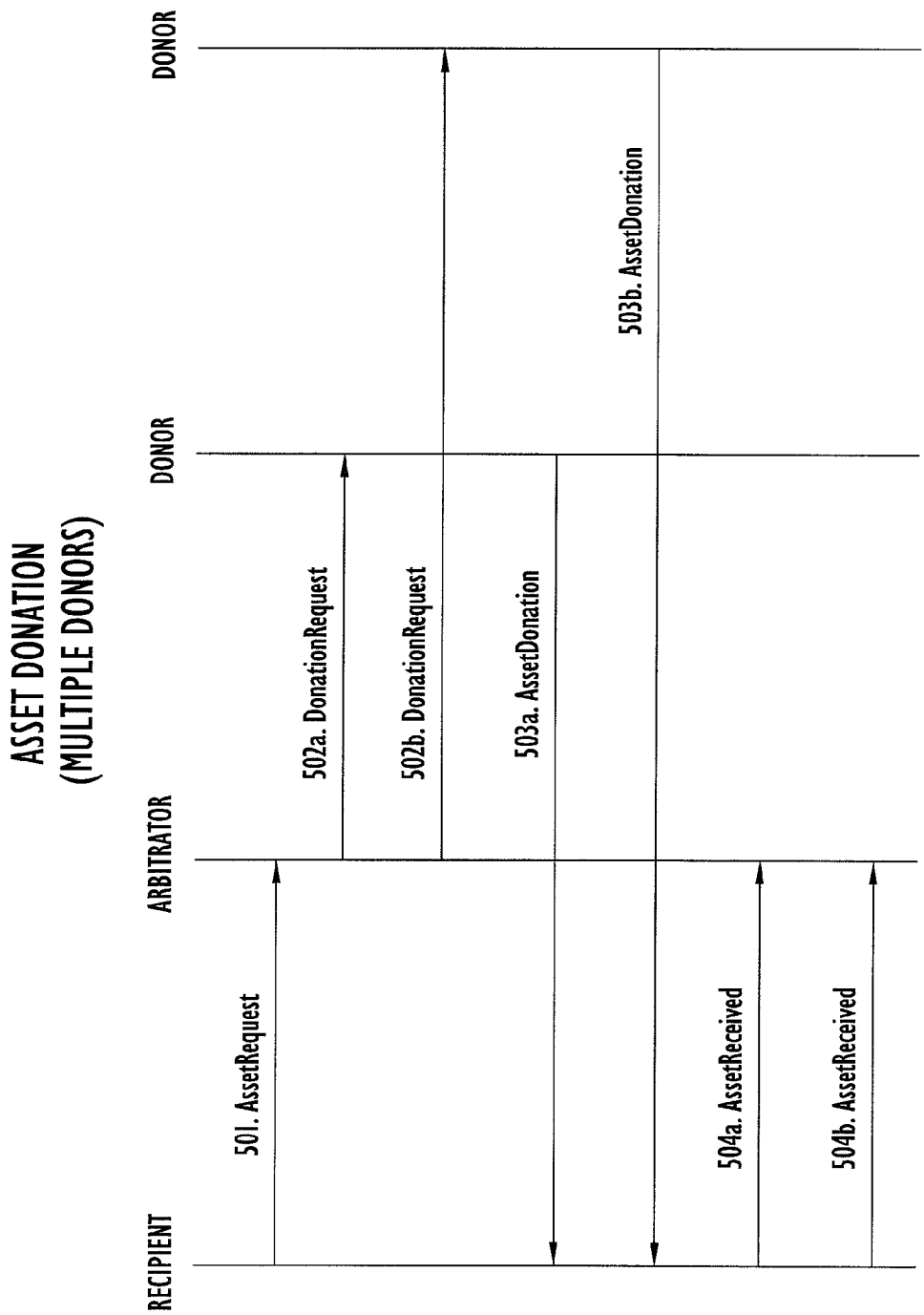

It is quite possible that a single Donor computer might not have all of the assets that a given Recipient computer requests. From a network overhead as well as anomaly remediation management perspective, it is preferable that the Arbitrator component attempts to satisfy an AssetRequest message from a Recipient computer with as few DonationRequests messages as possible. However, more than one DonationRequest message may be sent to fulfill the request if all of the assets in the AssetRequest message cannot be found on a single Donor computer. Thus, as shown in FIG. 5, a single AssetRequest message 501 to the Arbitrator component 133 may result in two separate DonationRequest messages 502a, 502b being sent to respective Donor computers. In turn, the Donor computers provide respective AssetDonation messages 503a, 503b to the Recipient computer. Asset donations are then separately acknowledged by sending respective corresponding AssetReceived messages 504a, 504b, such the Arbitrator component 113 can keep track of the pending and fulfilled asset requests.

In the event the Arbitrator component 113 cannot find a Donor computer for a particular asset being sought, an AssetRequestFailure message (not shown) is preferably sent to the Recipient for each such asset. In response to such as message, Agent component 202 resident on the requesting computer may be configured to do nothing, or may be configured to communicate with the Analytics component 110 (or other component) to provide notification that the Recipient computer may still be in need of a given asset, which asset may not be readily available. An alert message may also be dispatched to a system administrator indicating that a fully automated fix/repair of the Recipient computer could not be performed, and that special attention may therefore be necessary.

Figure 6:
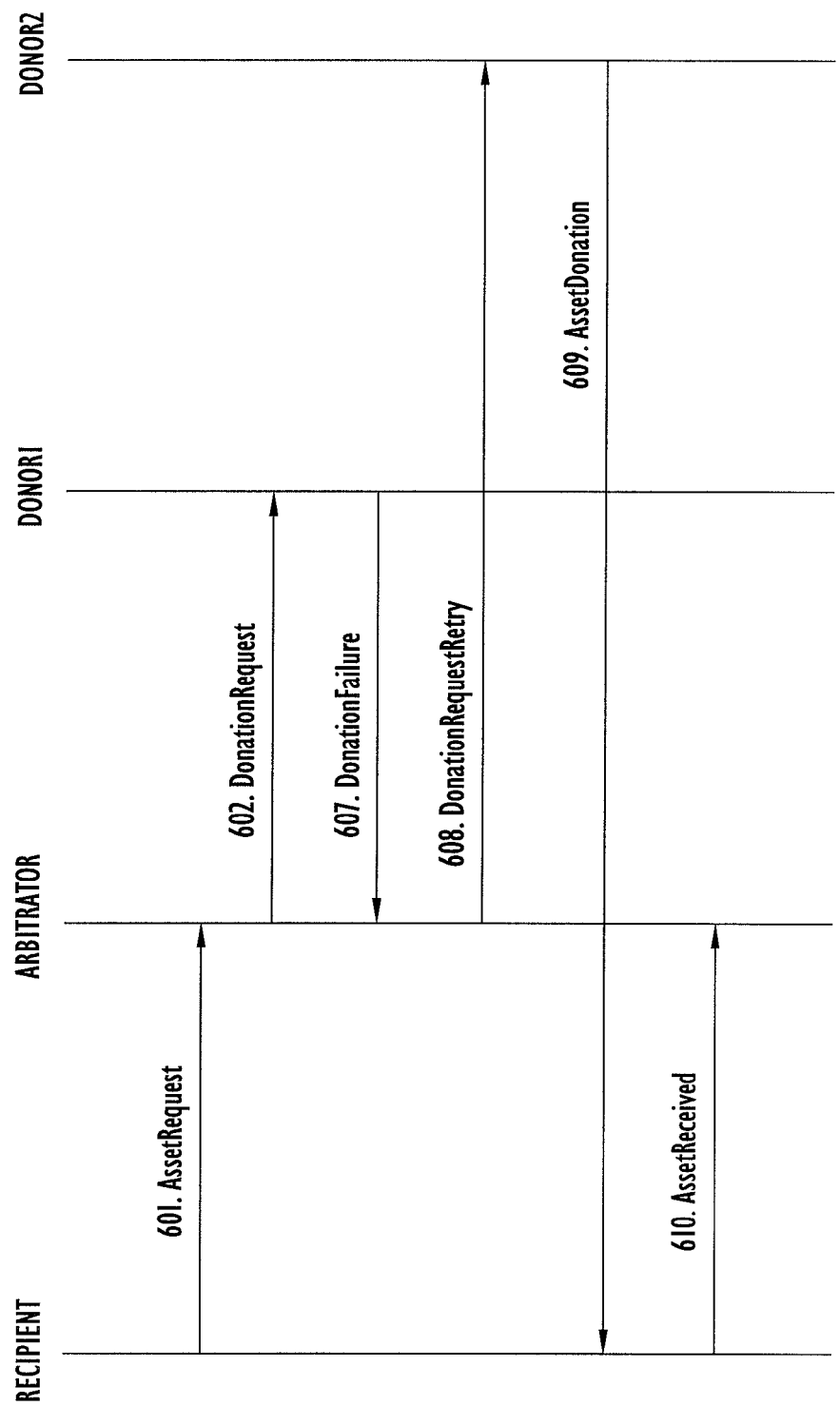

FIG. 6 depicts still another possible sequence of events in accordance with an embodiment of the present invention. In the interest of keeping the number of DonationRequest messages to a minimum, Arbitrator component 113 may receive an AssetRequest message and, in response thereto, send a DonationRequest message 602 to a first Donor computer (Donor1). That Donor computer may then respond with a DonationFailure message 607. Such a message may be generated because the Donor computer simply does not have the asset being sought, or, for example, because the Donor is busy with other processing that can not be interrupted. Still other reasons for a DonationFailure may be possible.

Upon receipt of such a DonationFailure message 607, Arbitrator component 113 may then send a DonationRequestRetry message 608 to a second, different, Donor computer (Donor2). This "retry" message may take the same form of a DonationRequest message 602, or may have a slightly different form indicative of the "retry" nature of the request. This DonationFailure and DonationRequestRetry sequence may repeat multiple times, as necessary, to finally locate a Donor computer that is in a position to generate and send an AssetDonation message 609 with the appropriate asset or corrective data.

In one embodiment, the Arbitrator component 113 keeps a list of possible Donors for the asset that will be tried in list order in case of further failures.

The Recipient computer, upon receipt or storage of the asset, preferably sends an AssetReceived message 610 to Arbitrator component 113 so that the pending asset request can be removed from a list being maintained by the Arbitrator component.

If all of the possible donors in the DonationRequestRetry are exhausted with no success, an AssetRequestFailure (not shown) is preferably sent to the requesting Recipient computer.

The following are several specific examples of types of corrupt or missing data for which remediation in accordance with the present invention may be performed.

EXAMPLE 1

Junk Email Settings Misconfigured

In this example, a user has mistakenly configured his level of junk email protection in Microsoft™ Outlook™ to "High" and to "permanently delete", which causes some valid emails to be flagged as junk and then automatically removed. These application settings are stored in registry keys. When the scan from the user's machine is checked against what is considered to be a normal computer state, the keys corresponding to this setting will be identified as anomalies of type Unknown Value, since the value of the keys differs from the rest of the population of machines. The Analytics component 110, for example, knows the signature of the correct values, and includes that information in a remediation message that is sent to the misconfigured computer. When the target machine receives this remediation message, it will request a donation of the correct registry keys from the Arbitrator component 113. The Arbitrator component 113, which has access to the analytics database containing the contents of all machines, will then locate potential donors which have the correct value. The Arbitrator component 113 then coordinates the donation of the correct registry keys from one or more selected Donors to the Recipient. When the misconfigured computer receives the donated assets, it replaces the existing ones, and the Junk email settings in Outlook™ will be restored to their original value.

More specifically, Microsoft™ Outlook™ by default moves junk e-mail to the Junk E-Mail folder. The Junk E-Mail folder provides the ability to review junk emails before deleting them. It is possible, however, to configure Outlook to simply delete junk e-mail instead of moving it to the Junk E-Mail folder. This option entails a certain amount of risk since it is possible that a legitimate e-mail may be identified as a junk e-mail and deleted. The registry key that controls this behavior is listed below.

Registry Key Name: hkcu\software\microsoft\windows nt\currentversion\windows messaging sub system\profiles\outlook\0a0d020000000000c000000000000046

Registry Value Name: 000b0416

When the value of this key equals 0000, then Outlook™ moves suspected junk e-mail to the Junk E-Mail folder, but does not automatically delete it. When the value of this key equals 0100, then Outlook™ automatically deletes suspected junk e-mail. If a value of 0100 is detected in an environment where the normal value is 0000, then the 0100 value will be perceived as an Unknown Value anomaly. This anomaly would be corrected by first identifying an appropriate donor machine and then requesting the Donor to send a copy of the correct registry key and value data.

EXAMPLE 2

Software Update Failure

Most large networks of computers employ some type of automated software/patch installation software, which pushes software updates to the computers on the network when they become available. Unfortunately, the success rate of the patch installation software is not 100% and there is usually no good mechanism for reacting to partial failures encountered while installing an update, which can leave a machine crippled. Once the non-loaded or failed actions of the patch are identified (such anomalies may turn up as, e.g., Unexpectedly Absent or Unknown Value anomalies). Since, for example, the Analytics component 110 knows the signatures for the correct files, keys, data, etc., the present invention can be employed to surgically repair the failed software installations using donated files/data from the other computers on the network, by locating the correct versions of these items on other computers on the network and coordinating a donation between the recipient and donor.

EXAMPLE 3

Altered Security Settings

Some computer networks, in use by military contractors and medical institutions for example, are required to conform to various security standards for all of their computers. If a user changes any of the system settings which make the computer non-compliant with the required standards, the responsible company may then be exposed to significant liability. In accordance with the present invention, when a computer is determined to be configured in a way that violates compliance, the specific settings that need to be changed are automatically repaired surgically through asset donation using items from the other computers on the network, and by changing only the misconfigured items, all with very little, if any, human intervention.

As those skilled in the art will appreciate from the foregoing disclosure, by implementing an automated system that includes a recipient computer, a Donor computer and a "middle man" Arbitrator component, a self-repairing network of computers is provided in which computers can donate known "good" assets to replace missing or damaged data on other computers within a managed network of computers.

The systems and methods described herein may be embodied in other specific forms without departing from the spirit or essential characteristics thereof. The foregoing embodiments are therefore to be considered in all respects illustrative and not meant to be limiting.

What is claimed is:

1. A method for correcting an anomaly in a target computer that is part of a network of computers, the method comprising:
    determining first corrective data needed to correct the anomaly in the target computer, wherein the target computer is part of the network of computers, the target computer comprising an agent component that is configured to detect the anomaly, wherein the anomaly is identified by:
        receiving respective snapshots from computers in the network of computers including the target computer, wherein one of the snapshots includes the data having the anomaly;
        creating an adaptive reference model based at least in part on the respective snapshots, wherein the adaptive reference model is operable to identify statistically significant patterns among the respective snapshots; and
        comparing at least one of the respective snapshots to the adaptive reference model;
    sending, using the agent component in the target computer, a request for the first corrective data;
    locating a donor computer among the plurality of computers in the network, wherein the donor computer includes the first corrective data that is needed to correct the anomaly and wherein the donor computer comprises a same agent component as the target computer;
    receiving the first corrective data at the target computer from the donor computer;
    correcting the anomaly in the data stored on the target computer using the first corrective data;
    receiving, at the target computer a request for second corrective data, wherein the request for second corrective data is sent from the donor computer; and
    sending, using the agent component in the target computer, the second corrective data for use by the donor computer, such that the target computer acts as a donor computer for purposes of the second corrective data.

2. The method of claim 1, wherein the anomaly comprises a missing file, missing data, or a missing portion of a file or missing data.

3. The method of claim 1, wherein the anomaly comprises a missing registry key.

4. The method of claim 1, wherein the anomaly comprises a corrupted file or corrupted data.

5. The method of claim 1, wherein the anomaly comprises a corrupted registry key.

6. The method of claim 1, further comprising:
    sending a request from the target computer to an arbitrator, the request being for the first corrective data.

7. The method of claim 6, further comprising:
    sending a donation request from the arbitrator to the donor computer, the donation request being for the first corrective data.

8. The method of claim 7, further comprising:
    receiving at the arbitrator a donation request failure message from the donor computer when the donor computer is not able to provide the first corrective data.

9. The method of claim 1, wherein the step of locating the donor computer comprises determining a physical location of the donor computer.

10. The method of claim 1, further comprising deleting data from the target computer.

11. A system for correcting an anomaly in data stored on a computer, comprising:
    a target computer, which is among a plurality of computers in a network of computers, having detected the anomaly in data stored therein, the target computer comprising an agent component that is configured to detect the anomaly and to send a request for a first asset;
    an arbitrator configured to receive the request for the first asset from the target computer, the first asset being sufficient to correct the anomaly once loaded on the target computer;
    at least one donor computer that receives a donation request from the arbitrator and in response thereto supplies the requested first asset to the target computer, the at least one donor computer comprising a same agent component as the target computer,
    wherein the arbitrator is configured to receive from the agent component on the at least one donor computer a request for another asset, and wherein the agent component on the target computer is configured to receive a donation request from the arbitrator and in response thereto supply the another asset to the at least one donor computer; and
    an analytics module that is configured to detect and identify the anomaly in data stored on the target computer, the analytics module is configured to:
        receive respective snapshots from the plurality of computers including the target computer, wherein at least one of the snapshots includes the data having the anomaly;
        create an adaptive reference model based at least in part on the snapshots, wherein the adaptive reference model is operable to identify statistically significant patterns in the snapshots;
        compare the at least one of the snapshots to the adaptive reference model; and
        identify the anomaly and the target computer based on the comparison.

12. The system of claim 11, wherein the arbitrator is configured to send multiple respective donation requests to multiple donor computers.

13. The system of claim 11, wherein the target computer is configured to acknowledge receipt of the first asset.

14. The system of claim 11, wherein the arbitrator is configured to send a second donation request to a second donor computer when a first donation request to a first donor computer has resulted in a failure.

15. The system of claim 11, wherein the agent component on the donor computer is in communication with at least the arbitrator.

16. The system of claim 15, wherein the agent component on the target computer is operable to communicate with the agent component on the at least one donor computer.

17. The system of claim 11, wherein the anomaly comprises at least one of a missing file, a missing portion of a file, a missing registry key, a corrupted file, or a corrupted registry key.

18. An automated method of curing an anomaly in a computer that is part of a network of computers, comprising:
- receiving an asset request from a target computer, the asset request being for corrective content that is to replace or augment data on the target computer and thereby cure the anomaly in selected data stored on the target computer, the target computer comprising an agent component that is configured to detect the anomaly, wherein the anomaly is identified by:
  - receiving respective snapshots from computers in the network of computers including the target computer, wherein one of the snapshots includes the data having the anomaly;
  - creating an adaptive reference model based at least in part on the respective snapshots, wherein the adaptive reference model is operable to identify statistically significant patterns among the respective snapshots; and
  - comparing at least one of the respective snapshots to the adaptive reference model;
- transforming the asset request into a donation request and sending the donation request to at least one donor computer, the at least one donor computer comprising a same agent component as the target computer;
- receiving from the target computer an indication that the asset has been received from the donor computer;
- receiving a second asset request from the at least one donor computer, the second asset request being for second corrective content that is to replace or augment data on the at least one donor computer;
- transforming the second asset request into a second donation request and sending the second donation request to the target computer; and
- receiving from the at least one donor computer an indication that the second asset has been received from the target computer.

19. The method of claim 18, further comprising receiving from an Analytics component an identification of the at least one donor computer.

20. The method of claim 18, further comprising sending multiple donation requests to multiple donor computers.

21. The method of claim 20, further comprising keeping track of pending donation requests.

* * * * *